United States Patent

Mugge et al.

Patent Number: 5,360,176
Date of Patent: Nov. 1, 1994

[54] BLENDER

[75] Inventors: Jan Mugge, Hoogeveen, Netherlands; Karen P. Morakis, Norwalk, Conn.

[73] Assignee: U.S. Philips Corporation, New York, N.Y.

[21] Appl. No.: 639,483

[22] Filed: Jan. 9, 1991

[30] Foreign Application Priority Data

Jan. 10, 1990 [NL] Netherlands ................. 9000059

[51] Int. Cl.$^5$ ............................................. A47J 43/07
[52] U.S. Cl. .................................. 241/282.1; 241/285.1
[58] Field of Search .................... 366/204, 205, 314; 241/101.2, 92, 282.1, 65, 282.2, 285 R, 285.1

[56] References Cited

U.S. PATENT DOCUMENTS

| | | |
|---|---|---|
| 2,282,866 | 5/1942 | Hagen . |
| 2,455,177 | 11/1948 | Irish . |
| 2,788,643 | 4/1957 | Martin . |
| 2,951,684 | 9/1960 | Labbe . |
| 4,488,817 | 12/1984 | Vesaka et al. . |
| 4,540,288 | 9/1985 | Pandolfi . |
| 4,885,917 | 12/1989 | Spector . |
| 4,887,909 | 12/1989 | Bennett . |
| 4,887,910 | 12/1989 | Bravo . |
| 4,889,248 | 12/1989 | Bennett . |

Primary Examiner—Mark Rosenbaum
Attorney, Agent, or Firm—Ernestine C. Bartlett

[57] ABSTRACT

A blender is provided which comprises a blender container (3) having an insulated container wall (12) formed by an outer wall (13) and, spaced therefrom, an inner wall (14), between which an insulating space (15) is formed. This enables ingredients in the container to be kept cool for a longer time. Moreover, the insulation relative to the bottom is improved by placing the blender container on a base (16).

5 Claims, 1 Drawing Sheet

BLENDER

BACKGROUND OF THE INVENTION

The invention relates to a blender, comprising a motor housing with a motor for driving a drive shaft, a blender container, adapted to be detachably placed on the motor housing, and a cutter holder, which can be secured in a bottom portion of the container and which rotatably supports a shaft provided with a cutter, which shaft is adapted to be coupled to the drive shaft.

A blender is used for grinding and/or blending ingredients such as juices, fruits, and the like. If for example beverages or cocktails are prepared, it is possible to add ice. Since such beverages are prepared particularly in summer, when it is hot, it is desirable to store the beverages in a cool place. This can be done by putting the blender container in a refrigerator or by pouring its content into an insulated container. This is inconvenient. The invention provides a solution for this.

SUMMARY OF THE INVENTION

An object of the invention is to provide a blender container whose content can be kept cool for a longer time.

To this end the blender in accordance with the invention is characterized in that means have been provided for thermally insulating the space inside the blender container from the environment.

Such an insulation can be obtained by insulating a container wall of the blender container over its entire length. As a result of this the content will retain its temperature, cold or hot, for a longer time.

Preferably, the container wall is constituted by an outer wall and, spaced therefrom, an inner wall, between which an enclosed insulating space is formed. This space may be filled with an insulating material in order to provide an even better insulation.

Moreover, the space may be provided with a moisture-absorbing material. This precludes condensation on the walls of the insulating intermediate space so that the walls, if made of a transparent material, remain transparent.

In a further embodiment, in order to insulate the space inside the blender container, the blender comprises a separate base on which the blender container with the cutter holder can be placed, an insulating space being formed between the cutter holder and the walls of the base. When the container is placed directly onto a table thermal leakage will occur by conduction and convection via the bottom of the container (cutter holder). If the container is placed on a base, as described above, an even better insulation is obtained. In addition, the base provides a higher stability.

BRIEF DESCRIPTION OF THE DRAWINGS

The invention will now be described in more detail, by way of example, with reference to a drawing in which.

DETAILED DESCRIPTION OF THE PREFERRED EMBODIMENTS

Figure 1:
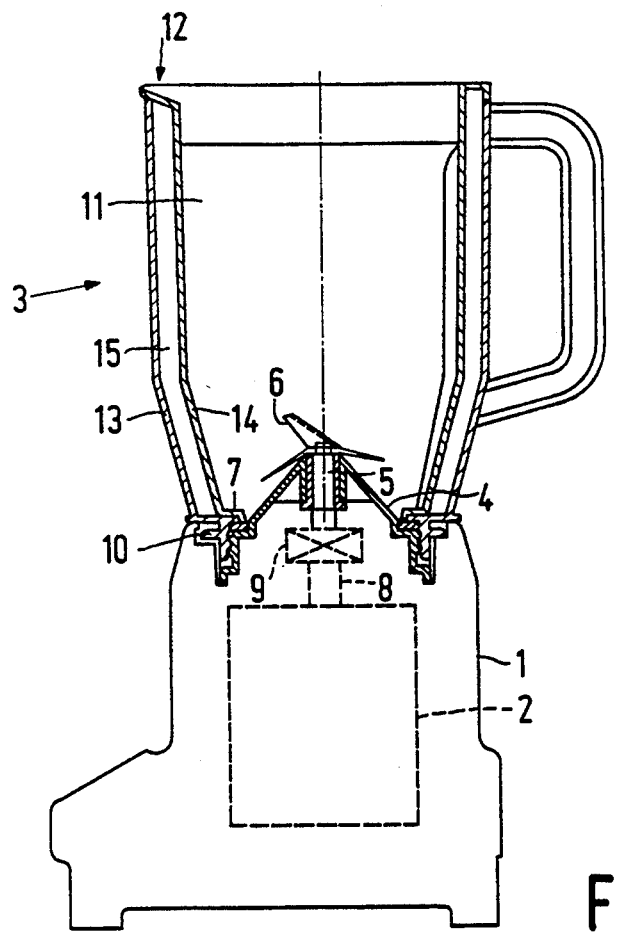
FIG. 1 shows a blender appliance with an insulated blender container.
Figure 2:
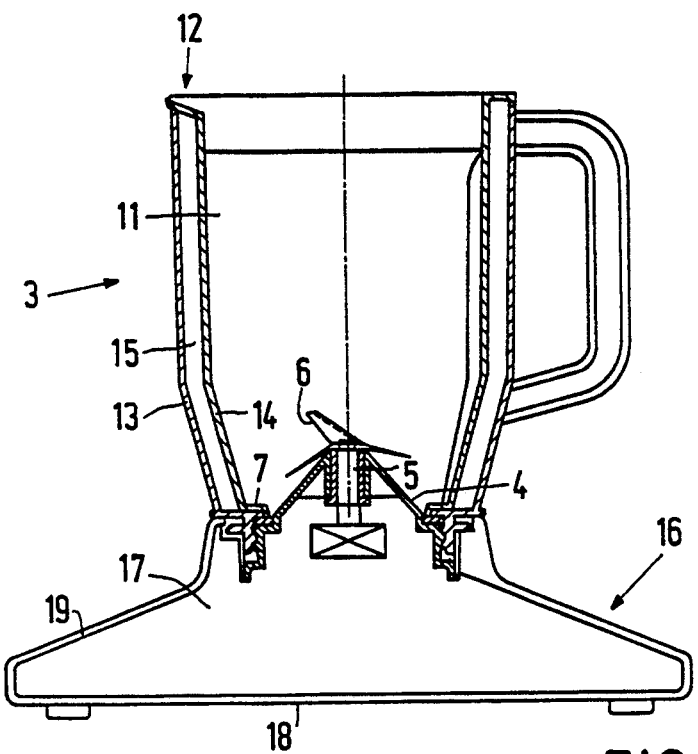
FIG. 2 shows the blender container of FIG. 1 placed on a base.

The blender shown in FIG. 1 comprises a motor housing 1, which accommodates a motor 2, and a blender container 3, which is adapted to be detachably placed on the motor housing. A cutter holder 4, which rotatably supports a shaft 5 with a cutter 6, is detachably secured in a bottom portion 7 of the blender container 3, for example by screwthread means. When the container 3 with the cutter holder 4 is placed onto the motor housing 1, the motor shaft or drive shaft 8 is coupled automatically to the shaft 5 (coupling 9). The blender container 3 can be locked to the motor housing 1, for example by means of a bayonet coupling 10.

In order to thermally insulate the space 11 inside the blender container 3 from its environment the container wall 12 is a double wall. The container in fact comprises two parts, namely an outer wall 13 and, spaced therefrom, an inner wall 14. In the present example the walls have been constructed as concentric cylindrical parts. The space 15 between these parts has been sealed hermetically. If the parts are made of a plastics material this can be achieved by welding the parts to each other at the bottom near A and at the top near B. If desired, the intermediate space 14 may be filled with a thermally insulating material and/or it may be provided with a moisture-absorbing material.

A further insulation can be obtained in that, after the cold beverage has been prepared, the blender container 3 (obviously with the cutter holder 4 secured in the container bottom) is placed on a separate base 16. The container may be locked to the base with a bayonet coupling of a type similar to that securing the container to the motor housing. The space 17 between the cutter holder 4 and the bottom 18 and the wall 19 of the base provides heat/cold insulation. If the base is made of a plastics material this material will also contribute to the insulation with respect to thermal conduction.

We claim:

1. An improved blender comprising
    (a) a plurality of separate bases, at least one first separate base comprising a motor housing (1) with a motor (2) for driving a drive shaft (8) mounted in the motor housing; and at least one second separate base (16), devoid of a motor or housing therefor and comprising a bottom (18) and a wall (19), said at least one second separate base including an insulating space;
    (b) a blender container (3) adapted to be detachably placed either on the motor housing of the first separate base or on the second separate base, said blender container (3) comprising container walls (12) which define an inner space (11) for blending ingredients, and a cutter holder (4), secured in a bottom portion (7) of the container and rotatably supporting a shaft (5) provided with a cutter (6), which shaft (5) is detachably coupled to the drive shaft (8) by coupling means (9); and
    (c) means for thermally insulating the inner space (11) inside the blender container (3) from the environment;
    wherein upon detachment of the thermally insulated blender container (3) from said first separate base and placement on said second separate base, the thermally insulated blender container (3) with the cutter holder (4) and shaft (5) provided with the cutter (6) and coupling means (9) and the second separate base form said insulating space (17) between the cutter holder (4) and the bottom (18) and the wall (19) whereby the inner space (11) is substantially completely insulated.

2. A blender as claimed in claim 1, wherein a container wall (12) of the blender container (3) has been insulated over its entire length.

3. A blender as claimed in claim 2, wherein the container wall (12) is constituted by an outer wall (13) and, spaced therefrom, an inner wall (14), between which an enclosed insulating space (15) is formed.

4. A blender as claimed in claim 3, wherein the insulating space (15) has been filled with an insulating material.

5. A blender as claimed in claim 4, wherein the insulating space (15) has been filled with a moisture-absorbing material.

* * * * *